United States Patent Office 3,242,184
Patented Mar. 22, 1966

3,242,184
SULFUR LINKED PHTHALOYL-PYRROCOLINES
Eduard Moser, deceased, late of Bottmingen, Switzerland, by Franz Huber, legal representative, Basel, Switzerland, and Paul Mueller-Gutjahr, Basel, Switzerland, assignors to Ciba Limited, Basel, Switzerland, a company of Switzerland
No Drawing. Filed Apr. 27, 1964, Ser. No. 363,018
Claims priority, application Switzerland, Apr. 30, 1963, 5,455/63
9 Claims. (Cl. 260—272)

The present invention provides new dyestuffs of the general formula (1)

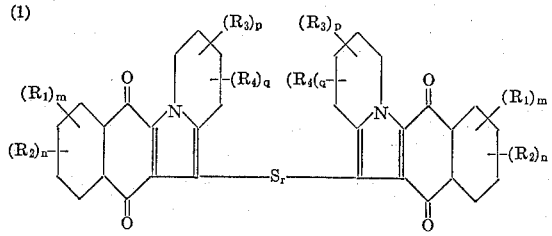

in which $R_1$, $R_2$, $R_3$ and $R_4$ represent hydrogen atoms or substituents that do not impart solubility in water, of which, each two substituents in ortho-position to each other are capable of forming a ring together with the vicinal carbon atoms of the basic structure, and $m$, $n$, $p$, $c$, and $r$ each represent 1 or 2.

The new dyestuffs are obtained when a 2:3-phthaloyl-pyrrocoline of the formula (2)

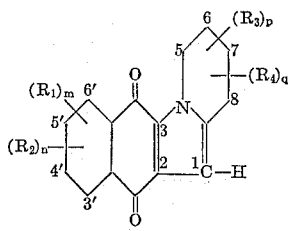

(nomenclature of the pyrrocoline ring according to the Patterson Ring Index) in which $R_1$, $R_2$, $R_3$ and $R_4$ represent hydrogen atoms or substituents that do not impart solubility in water, of which, each two substituents in ortho-position to each other are capable of forming a ring together with the vicinal carbon atoms of the basic structure, and $m$, $n$, $p$, and $q$ each represent 1 or 2, are reacted with a sulphur-halogen compound of the formula $$SO(hal)_2 \text{ or } S(hal)_2$$

The dyestuffs of the Formula 1, in which $r$ represents 1, are obtained by reacting compounds of the Formula 2 with a sulphur-halogen compound of the formula $SO(halogen)_2$, for example, $SOBr_2$, especially $SOCl_2$. Dyestuffs of the Formula 1, in which $r$ represents 2, are obtained by reacting compounds of the Formula 2 with a sulphur-halogen compound of the formula $S_2halogen_2$, for example, $S_2Br_2$, but more especially $S_2Cl_2$.

The reactions are advantageously carried out in an organic solvent, for example, chlorobenzene, orthodichlorobenzene, trichlorobenzene or nitrobenzene, preferably at an elevated temperature, particularly in the range between 90 and 125° C.

The presence of dimethylformamide or an agent capable of binding acid, for example, pyridine, during the reaction has a specially favourable influence on the yield of end product.

In the phthaloylpyrrocolines of the Formula 2, $R_3$ and $R_4$ advantageously represent hydrogen atoms or simple substituents, for example, halogen atoms or low alkyl groups, and $R_3$ and $R_4$ are also capable of forming an alicyclic, heterocyclic or aromatic ring, especially a benzene ring, with the vicinal carbon atoms of the pyridine ring. $R_1$ and $R_2$ likewise advantageously represent hydrogen atoms or halogen atoms, especially chlorine or bromine atoms or nitro groups or acylamino groups.

The 2:3-phthaloylpyrrocolines of the Formula 2 may be prepared in a simple manner, for example, by hydrolysing the corresponding 2:3-phthaloylpyrrocoline-carboxylic acid esters, which may be prepared from pyridine by the process disclosed in United States Patent No. 2,877,230, patented March 10, 1959, to Robert S. Long et al., and subsequently decarboxylating the resulting 2:3-phthaloyl-pyrrocoline-carboxylic acid.

The 2:3-phthaloyl-7:8-benzopyrrocolines may be prepared similarly from the corresponding 2:3-phthaloyl-7:8-benzopyrrocoline-carboxylic acid esters which may be obtained in an analogous manner by using an equivalent proportion of isoquinoline instead of pyridine. The preparation of the 1-carboxylic acid esters of 2:3-phthaloyl-7:8-benzopyrrocoline and other substitution products is described by E. F. Pratt et al., in the Journal of American Chemical Society, 79, 1212 (1957).

A great number of pyrrocolines may be used as starting materials in the preparation of the new dyestuffs of the Formula 1 in accordance with the invention, for example, unsubstituted 2:3-phthaloylpyrrocoline or the substitution products thereof, for example, 2:3-phthaloyl-7:8-benzopyrrocoline or 4'(5')-chloro-2:3-phthaloyl-7:8-benzopyrrocoline.

The dyestuffs of the invention can be used for dyeing or coloring a very wide variety of materials, for example, for dyeing cellulosic fibres from a vat or, after the introduction of sulpho groups, for dyeing animal fibres, for example, wool and silk, or synthetic fibres having similar dyeing properties, for example, polyamides. However, they are specially suitable for use as pigment dyestuffs and can be applied in all the usual processes, for example, in pigment printing, that is to say, in printing processes in which pigments are fixed on a substratum, particularly a fibrous textile or other sheet-like substratum, such as paper (for example, wallpaper) or fabrics of glass fibres, with a suitable adhesive, such as casein, a thermo-setting resin, particularly a urea- or melamine-formaldehyde condensation product, or solutions or emulsions or polyvinyl chloride or polyvinyl acetate, or other emulsions (for example, oil-in-water or water-in-oil emulsions). The pigments of the invention can also be used for other purposes, for example, in a finely divided form for the spin-dyeing of viscose rayon or cellulose ethers or esters or polyamides or polyurethanes, and also for the manufacture of colored lacquers or lakes, solutions or products of cellulose acetate, nitrocellulose and natural and synthetic resins, such as polymerization resins, for example, polyvinyl chloride or polystyrene, and condensation resins, for example, aminoplasts, phenoplasts, and also polyethylene, polystyrene, rubber, casein, silicone and silicone resins. They can also be used with advantage in the manufacture of colored pencils, cosmetic preparations or laminated sheet material.

By virtue of their chemical inertness and good heat resistance, the pigments of the invention can be dispersed in the usual manner in the aforesaid masses and preparations, and this is advantageously carried out at a stage before the said masses and preparations have reached their final form. Since the pigments are obtained from the synthesis in the form of soft granules, they do not require further conditioning apart from the usual comminution.

The operations required for converting the products into their final form, such as spinning, pressing, hardening, casting, cementing and the like can be carried out in the presence of the pigments of the invention.

The pigments of the invention are distinguished by a good fastness to light and to migration.

The following examples illustrate the invention. Unless otherwise stated, the parts and percentages are by weight.

EXAMPLE 1

24.7 parts of 2:3-phthaloylpyrrocoline were heated to 90° C. in 195 parts of anhydrous ortho-dichlorobenzene while stirring. 13 parts of thionyl chloride were dropped into the suspension in the course of approximately 5 minutes and then 3 parts of dimethylformamide were added. The whole was heated to 120° C. and kept at that temperature for 2 hours. The reaction mixture was then allowed to cool to 100° C. and the precipitated ruby-red crystals were filtered, washed successively with ortho-dichlorobenzene at 100° C., cold methanol and hot water and then dried in vacuo at 100° C. The pigment thus obtained corresponded to the formula

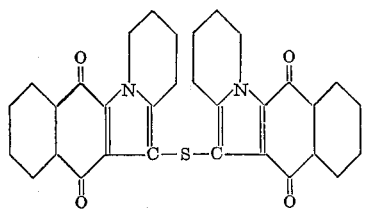

It colored polyvinyl chloride a pure ruby tint. Elementary analysis gave the following figures:

Found: C, 73.34%; H, 3.08%; O, 12.35%; N, 5.32%; S, 6.15%. Calculated ($C_{32}H_{16}O_4N_2S$): C, 73.27%; H, 3.05%; O, 12.20%; N, 5.34%; S, 6.14%.

EXAMPLE 2

29.7 parts of 2:3-phthaloyl-7:8-benzopyrrocoline were heated to 90° C. with 195 parts of anhydrous nitrobenzene and 3 parts of dimethylformamide while stirring. 13 parts of thionyl chloride were added to the suspension dropwise in the course of 5 minutes and the whole heated for 15 hours at 90 to 95° C. The pigment, which precipitated in the form of red crystals, was filtered, washed successively with nitrobenzene at 100° C., cold ethanol and hot water, and then dried in vacuo at 100° C. It colored polyvinyl chloride a bluish red tint.

Elementary analysis of the pigment gave the following figures:

Found: C, 76.80%; H, 3.38%; O, 10.98%; N, 4.45%; S, 5.13%. Calculated ($C_{40}H_{20}O_4N_2S$): C, 76.94%; H, 3.21%; O, 10.25%; N, 4.48%; S, 5.12%.

EXAMPLE 3

33.1 parts of 4'(5')-chloro-2:3-phthaloyl-7:8-benzopyrrocoline (prepared from 4' (5')-chloro-2:3-phthaloyl-7:8-benzopyrrocoline-1-carboxylic acid ethyl ester by hydrolysis and decarboxylation in quinoline: M.P. 285° C. (uncorrected)) were heated to 90° C. in 195 parts of anhydrous ortho-dichlorobenzene and 3 parts of dimethylformamide while stirring gently. 13 parts of thionyl chloride were added dropwise to the suspension thus obtained in the course of approximately 5 minutes, the whole was then heated to 120° C. and kept at 120 to 125° C. for 2 hours. The reaction mixture was then allowed to cool to 100° C., the precipitated red crystalline pigment was filtered, washed successively with ortho-dichlorobenzene at 100° C., cold ethanol and hot water, and then dried in vacuo at 100° C. It colored polyvinyl chloride ruby-red tints.

Elementary analysis of the pigment gave the following figures:

Found: C, 69.30%; H, 2.50%; O, 9.30%; N, 4.10%; Cl, 10.90%; S, 4.75%. Calculated ($C_{40}H_{18}O_4N_2Cl_2S$): C, 69.28%; H, 2.60%; O, 9.23%; N, 4.04%; Cl, 10.24%; S, 4.63%.

Coloration process.—A mixture of 65 parts of polyvinyl chloride, 35 parts of dioctyl phthalate and 1 part of the pigment obtained by the process described in Example 3 was worked to and for on a two-roll calender for 7 minutes at 150° C. A ruby-red foil possessing a good fastness to migration and to light was obtained.

EXAMPLE 4

29.7 parts of 2:3-phthaloyl-7:8-benzopyrrocoline were stirred with 260 parts of anhydrous ortho-dichlorobenzene, and 18.5 parts of sulphur monochloride were added dropwise at 80 to 85° C. in the course of 5 to 10 minutes while stirring. The whole was heated to 120° C. and kept at that temperature for 2 hours. The reaction mixture was then diluted with 200 parts of ortho-dichlorobenzene, allowed to cool to 100° C., and the red pigment isolated by filtration. It was washed successively with ortho-dichlorobenzene at 100° C., cold ethanol and water, and then dried in vacuo at 100° C. It gave a deep blue solution in concentrated sulphuric acid and produced a red tint when incorporated in polyvinyl chloride on a roller mill. The pigment had the formula

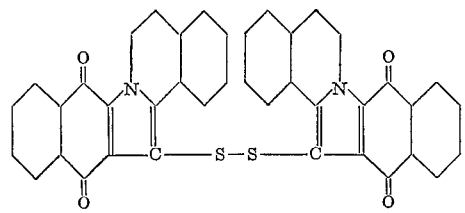

Elementary analysis gave the following figures:

Found: C, 72.9%; H, 3.0%; O, 9.5%; N, 4.2%; S, 9.7%. Calculated ($C_{40}H_{20}O_4N_2S_2$): C, 73.18%; H, 3.05%; O, 9.76%; N, 4.27%; S, 9.76%.

EXAMPLE 5

28.15 parts of 4'(5')-chloro-2:3-phthaloyl-pyrrocoline (prepared from 4'(5')-2:3-phthaloyl-pyrrocoline-1-carboxylic acid by decarboxylation in quinoline, M.P. 232° C.) were heated to 90° C. in 200 parts of anhydrous ortho-dichlorobenzene and 3 parts of dimethylformamide while gently stirring. 15 parts of thionyl chloride were added dropwise to the suspension thus obtained in the course of approximately 10 minutes, the whole heated to 120° C. and kept at that temperature for 2 hours. The reaction mixture was allowed to cool to approximately 100° C., the precipitated pigment in the form of wine-red crystals was filtered, washed thoroughly with hot ortho-dichlorobenzene, then with methanol and again with hot water. It was dried in vacuo at 90° C. It corresponded to the formula

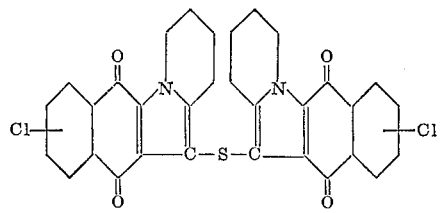

Analysis.—Found: C, 64.66%; H, 2.21%; O, 10.87%; N, 4.69%; S, 5.32%; Cl, 11.93%. Calculated ($C_{32}H_{14}O_4N_2SCl_2$)

C, 64.77%; H, 2.38%; O, 10.79%; N, 4.72%; S, 5.40%; Cl, 11.95%. It produced a wine-red tint in polyvinyl chloride.

The same pigment was obtained when 25 parts of thionyl bromide were used instead of 15 parts of thionyl chloride.

EXAMPLE 6

24.7 parts of 2:3-phthaloyl-pyrrocoline were stirred with 200 parts of anhydrous ortho-dichlorobenzene and 19 parts of sulphur monochloride were added dropwise at about 90° C. in the course of approximately 5 minutes. The whole was heated to 125° C. and stirred for 2 hours at 120 to 125° C. The reaction mixture was then allowed to cool to about 100° C., the precipitated pigment in the form of fine wine-red crystals was isolated by filtration, washed thoroughly with ortho-dichlorobenzene at about 100° C., then with cold methanol and again with hot water. It was dried in vacuo at 90° C. The pigment corresponded to the formula

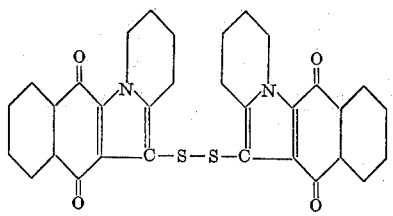

It produced wine-red tints in polyvinyl chloride.

EXAMPLE 7

28.15 parts of 4'(5')-chloro-2:3-phthaloyl-7:8-benzopyrrocoline were heated to 90° C. with 200 parts of anhydrous ortho-dichlorobenzene while stirring, and 18.5 parts of sulphur monochloride were added dropwise to the suspension thus obtained in the course of approximately 10 minutes. The whole was then heated for 2 hours at 120 to 125° C. After cooling to about 100° C. the precipitated pigment in the form of fine wine-red crystals was filtered, washed thoroughly with ortho-dichlorobenzene at about 100° C., then with cold methanol and finally with hot water. It was then dried in vacuo at 90 to 100° C. The pigment corresponded to the formula

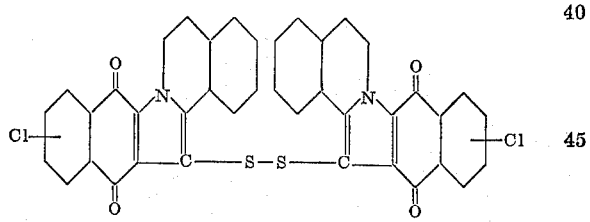

*Analysis.*—Found: C, 66.80%; H, 2.50%; O, 9.00%; N, 3.90%; Cl, 10.10%; S, 7.95%. Calculated $(C_{40}H_{18}O_4N_2Cl_2S_2)$ C, 66.20%; H, 2.48%; O, 8.82%; N, 3.86%; Cl, 9.79%; S, 8.82%. It produced wine-red tints in polyvinyl chloride.

EXAMPLE 8

When the 13 parts of thionyl chloride were replaced by 23 parts of thionyl bromide in the process of Example 1, the pigment described in Example 1 was similarly obtained (determined by analysis and infra-red spectrum).

EXAMPLE 9

29.2 parts of 6'-nitro-2:3-phthaloylpyrrocoline (obtained from 6-nitro-2:3-phthaloylpyrrocoline-1-carboxylic acid by decarboxylation in quinoline, M.P. above 320° C.) were stirred with 400 parts of anhydrous ortho-dichlorobenzene, heated to 90° C. and 3 parts of dimethylformamide added drop by drop. 18 parts of thionyl chloride were then added dropwise in the course of about 10 minutes to the fine suspension thus obtained, the whole heated to 120° C. and stirred for 2 hours at 120 to 125° C. The reaction mixture was then allowed to cool to about 100° C. and the precipitated pigment in the form of brown crystals was filtered, washed thoroughly with ortho-dichlorobenzene at about 100° C., then with cold methanol and finally with hot water. It was dried in vacuo at 90° C. The pigment corresponded to the formula

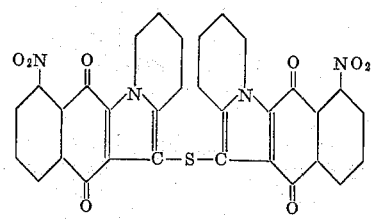

It produced a violet-brown tint in polyvinyl chloride.

What is claimed is:

1. A dyestuff of the phthaloyl-pyrrocoline series of the formula

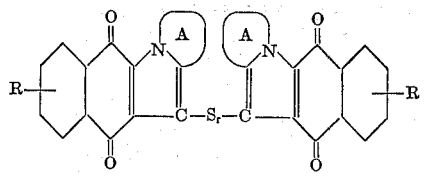

A represents a member selected from the group consisting of benzene and naphthalene radicals in which R represents a member selected from the group consisting of a hydrogen atom, a halogen atom and a nitro group and $r$ is a whole number from 1 to 2.

2. The compound of the formula

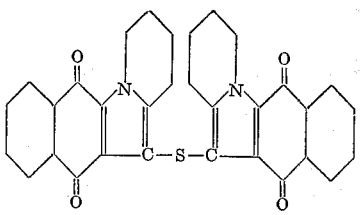

3. The compound of the formula

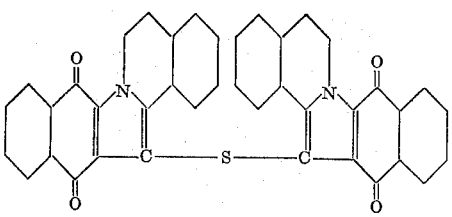

4. The compound of the formula

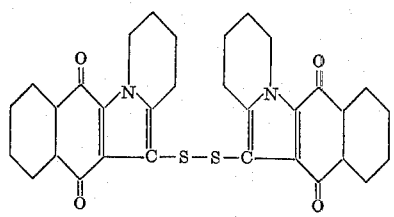

5. The compound of the formula

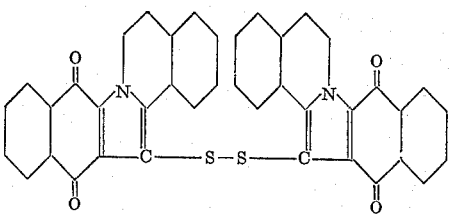

6. A process of the manufacture of the dyestuffs as claimed in claim 1 which comprises reacting a phthaloyl-pyrrocoline of the formula

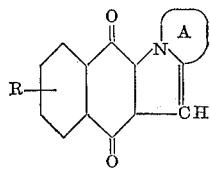

in which A represents a member selected from the group consisting of benzene and naphthalene radicals in which R repersents a member selected from the group consisting of a hydrogen atom, a halogen atom and a nitro group with a halogen-sulfur compound selected from the group consisting of the formulae $SO(Hal)_2$ and $S(Hal)_2$ in which formulae Hal is halogen.

7. A process as claimed in claim 6 wherein the reaction is carried out in an inert high boiling solvent at a temperature of 90 to 120° C.

8. A process as claimed in claim 1, wherein dimethylformamide is used as catalyst.

9. A process as claimed in claim 1, wherein for two mols of phthaloylpyrrocoline 1 to 2 mols of sulfur halogen compound are used.

References Cited by the Examiner

UNITED STATES PATENTS

| | | | |
|---|---|---|---|
| 2,772,274 | 11/1956 | Schmidt-Nickels | 260—272 X |
| 2,772,275 | 11/1956 | Schmidt-Nickels | 260—272 X |
| 2,773,873 | 12/1956 | Randall | 260—272 |
| 3,057,847 | 10/1962 | Moser et al. | 260—294.8 X |
| 3,088,949 | 5/1963 | Moser et al. | 260—281 |

NICHOLAS S. RIZZO, *Primary Examiner.*